May 12, 1931.   J. T. HOYT   1,804,934
FLUID PRESSURE DISCHARGE FOR CONTINUOUS FILTERS
Filed Sept. 9, 1927   4 Sheets-Sheet 1

INVENTOR
John T. Hoyt,
BY
ATTORNEYS

May 12, 1931. J. T. HOYT 1,804,934
FLUID PRESSURE DISCHARGE FOR CONTINUOUS FILTERS
Filed Sept. 9, 1927 4 Sheets-Sheet 2
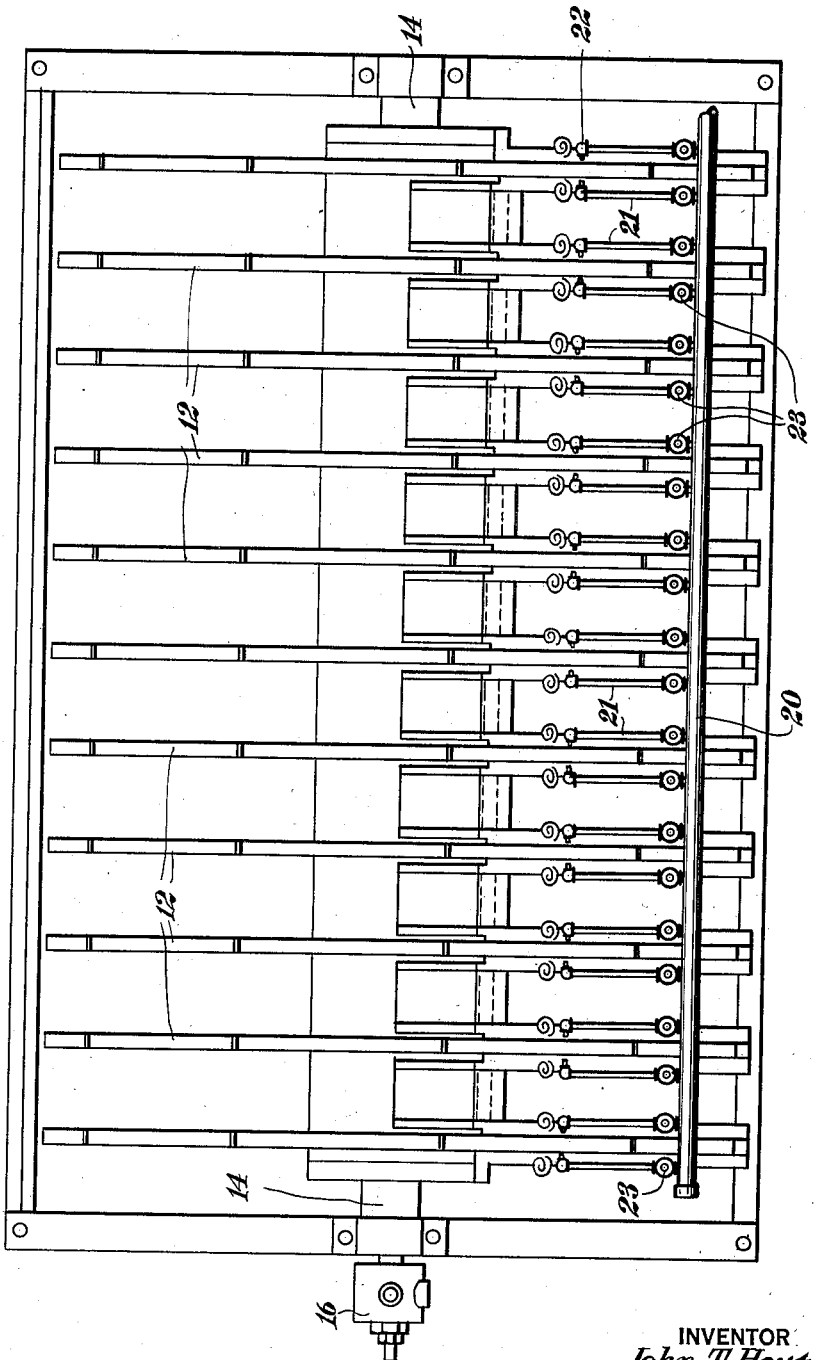
INVENTOR
John T. Hoyt,
BY
ATTORNEYS

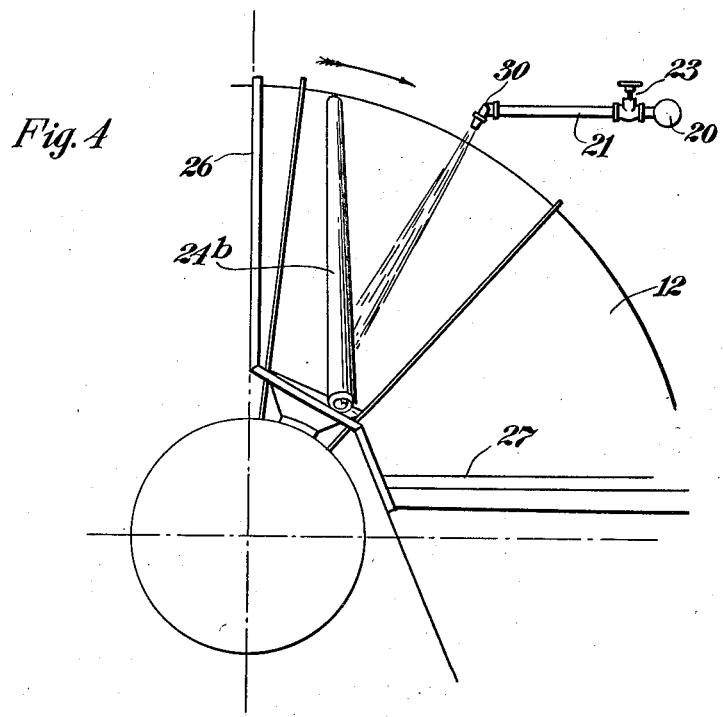
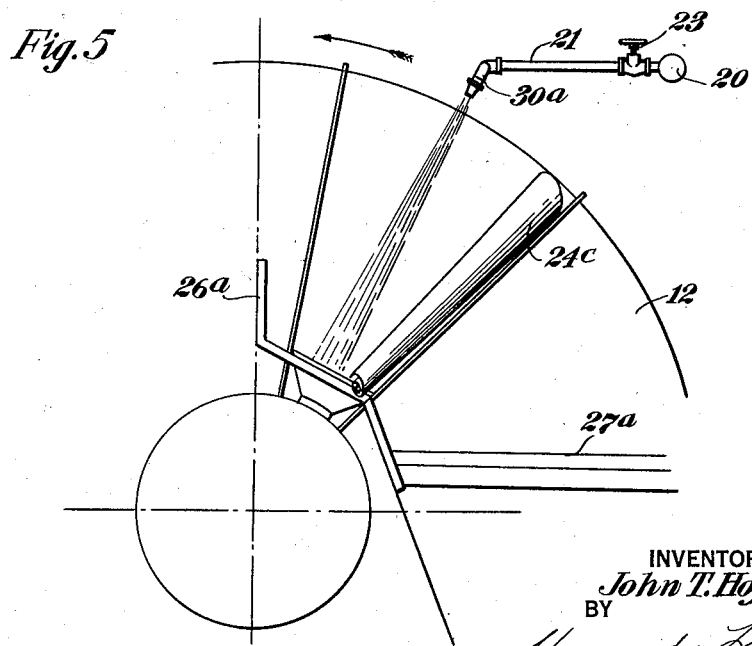

May 12, 1931.  J. T. HOYT  1,804,934
FLUID PRESSURE DISCHARGE FOR CONTINUOUS FILTERS
Filed Sept. 9, 1927  4 Sheets-Sheet 4
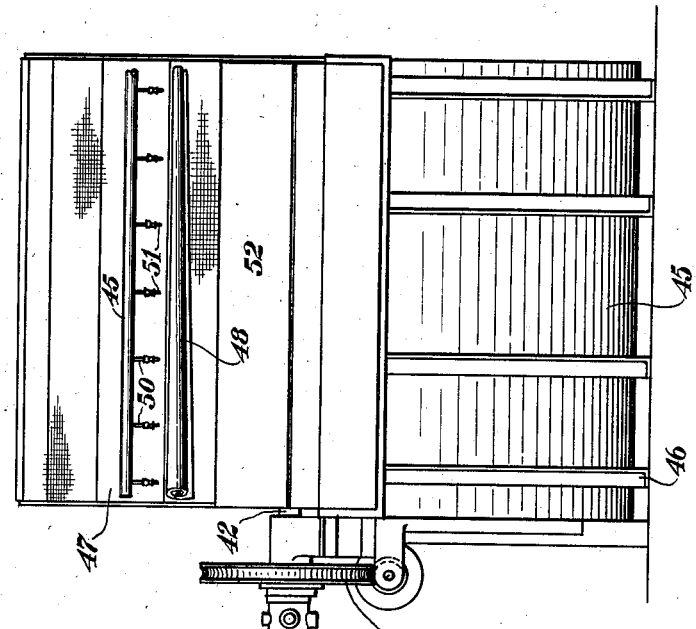
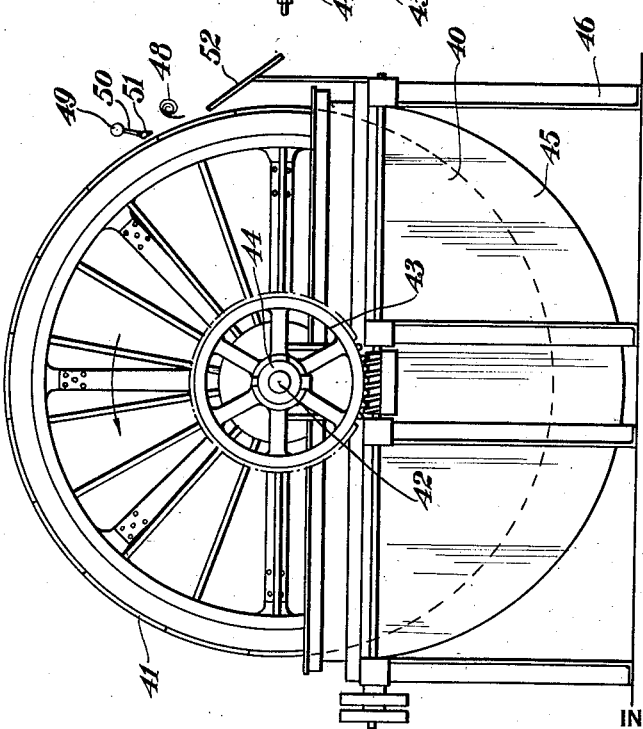
INVENTOR
John T. Hoyt,
BY
ATTORNEYS Patented May 12, 1931

1,804,934

UNITED STATES PATENT OFFICE

JOHN T. HOYT, OF HAZLETON, PENNSYLVANIA, ASSIGNOR, BY MESNE ASSIGNMENTS, TO OLIVER UNITED FILTERS INC., OF SAN FRANCISCO, CALIFORNIA, A CORPORATION OF NEVADA

FLUID PRESSURE DISCHARGE FOR CONTINUOUS FILTERS

Application filed September 9, 1927. Serial No. 218,443.

This invention relates to improvements in dischargers for continuous filters and particularly relates to means for discharging the accumulated filter cake from a rotating type filter by means of fluids under pressure.

It is one of the objects of this invention to provide an extremely simple means for removing the accumulated cake or solids forming on the filter medium of a continuous filter by the use of fluids under pressure to prevent wear on the filter medium and to reduce the frequency of the cleaning operation.

It is another object of this invention to remove accumulated solids from a rotating filter more satisfactorily and more completely by a fluid pressure means which does not injure the filter fabric, and which does not in itself require repair and frequent adjustment, thus improving operating conditions.

It is still another object of this invention to remove the filter cake from a rotating continuous filter by means of a properly directed jet of vapor, gas, or liquid directed against the surface of the filtering medium and thus reducing the number of moving parts of the discharger to a minimum.

It is still another object of this invention to provide a more economical and more efficient discharge means using a stream of fluid under pressure such as water or air or similar liquids or fluids that is readily adapted to be used on either the drum or disc type of continuous rotating filters and which will permit, by its quick and complete discharge, an increase in sped and capacity of the filter.

Further objects and advantages of this invention will appear from the following detailed disclosure of preferred forms of embodiment of the invention together with the illustrative drawings attached hereto, in which, Figure 1 is an end view of a continuous rotating disc filter showing the location of the discharger nozzle.

Figure 2 is a plan view of the multiple disc, continuous filter shown in Figure 1, showing the location of the longitudinal header.

Figure 4 is a similar diagrammatic sketch showing the disc rotating clock-wise.

Figure 5 is a diagrammatic sketch of the disc rotating counter clock-wise and air being used as the pressure medium.

Figure 6 is an end view of a continuous rotating drum type filter, and,

Figure 7 is a side elevation thereof, showing the adaptation of my invention thereto.

Figure 1:
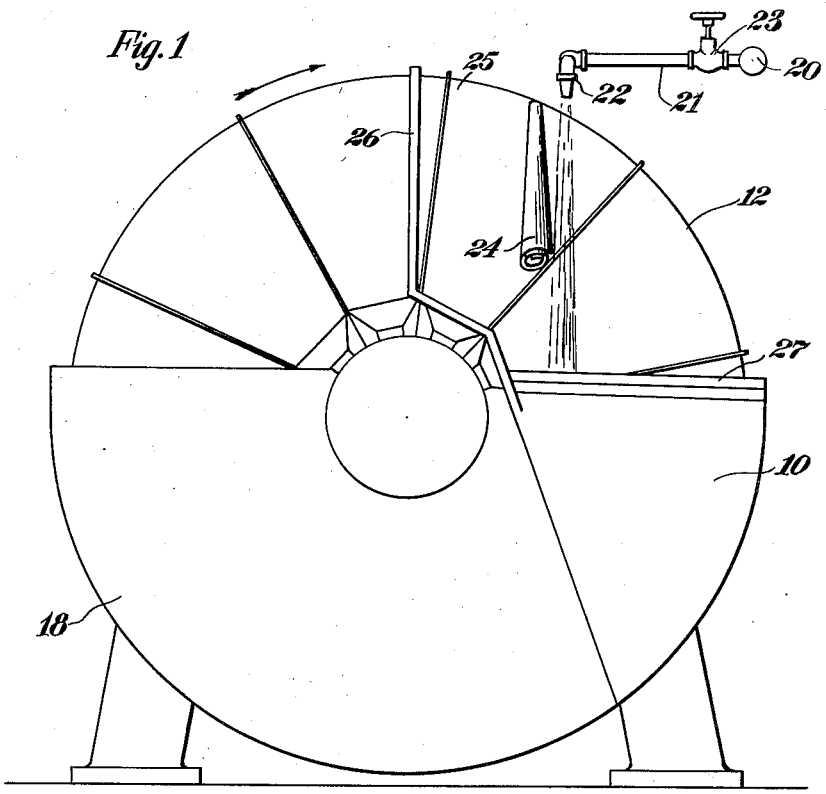

In the embodiment of the invention illustrated in Figures 1 and 2, a continuous multiple disc filter 10 of the rotating type is provided with a series of discs 12 composed of sectors built up about a central hollow rotatable shaft 14 at the end of which is a valve 16 controlling the internal vacuum on the filter discs 12.

The central part of the sectors of these discs 12 are hollow and connected by suitable conduits to interior conduits in the hollow filtrate shaft 14 and which extend to the controlling valve 16. The sides of the disc are covered with a suitable backing screen or other drainage medium and filter cloth which is adapted to permit water to pass through and to retain the solids on the surface to form the filter cake. The discs rotate through a reservoir of filter pulp and at proper times, the vacuum is connected with the appropriate disc thus drawing the pulp on the disc and as the water passes through and is discharged, the solids accumulate on the surface. During the remainder of the rotation, these solids must be removed because as the rotation is continuous, if they are not removed, very little more cake could be formed. It is also essential that the cake be removed quickly and clearly without undue wear on the parts during each rotation of the discs so that the filtering process may be efficiently carried out.

This operation is well known in the present commercial practice and a scraper of some form has been used to remove this cake of accumulated solids. These scrapers however, wear out themselves and at times seriously wear and damage the filter fabric as well as not completely or quickly cleaning and removing the accumulated solids. Scraper dischargers require frequent attention and adjustment and because of incomplete cleaning, the discs have to be cleaned frequently. This cleaning requires completely stopping the filter and sometimes involves disassembling the discs and many other various parts and is therefore very expensive and time consuming. The first cost and upkeep of the heretofore used dischargers as well as their inefficiency are highly objectionable.

When roller dischargers are used, although they clean the cloth more thoroughly than the scrapers, they too, are subject to the disadvantages of seriously wearing the filter cloth, their own wear which is considerable, and the multiplicity of gear shafts and other parts necessary for their operation which wear out. A large number of moving parts in the roller dischargers may be eliminated and this prevents wear and replacement. The filters using roller dischargers also must be stopped at intervals to permit cleaning of the discs.

A far superior and more effective discharger for removing this cake is disclosed in the attached drawings and in particular the adaptation to a rotating continuous disc filter is shown in Figure 1. A longitudinal conduit or header 20 suitably connected to a source of fluid pressure (not shown), is supported adjacent the peripheral edge of the discs 12. A projecting conduit 21 extends to each side of these discs 12 and is tipped with an adjustable nozzle 22. This nozzle may preferably be of the standard ball and socket form allowing adequate adjustment in all directions. As will be obvious, the discharge of this nozzle, which directs a narrow jet of fluid, may be adjusted as to location by the ball and socket joint and as to volume by the valve means 23. When the valve 23 is open and the nozzle 22 properly directed, the cake will be removed completely and quickly, from the discs with a slicing action, with no damage to the filter fabric.

As shown in Figure 1, if the filter discs 12 are rotating in a clockwise direction and a liquid for the discharger such as water being used, the nozzle 22 directs the liquid so that it will strike the side near the peripheral edge of the disc. The position of the nozzle is then approximately three inches from the edge of the disc and about five-eighths of an inch from the plane of the disc surface. The nozzle is twisted until the plane of the jet makes an angle of about thirty degrees with the plane of the disc and is tilted so that one edge of the jet strikes the surface of the disc slightly outside the edge of the cake. The nozzle must be set so that as the disc rotates toward the jet, the edge of the jet which strikes the outer edge of the disc cuts the cake away from the surface of the disc while the other edge holds it away. In this forward or clock-wise direction of rotation of the discs 12, the center line of the nozzle should be in an approximately vertical position although slight misalignment will not seriously affect the discharge of the cake. The nozzle 22 may be on either side of the vertical center line of the disc 12, depending upon whether the cake is to be removed in a wet or dry condition, it being more completely dried in the rotation from the emergence position on the left horizontal center line to the upper center vertical line. The more rotation, the more the cake will dry.

In operation, the fluid, usually water, is forced under pressures of about eighty-five to one hundred pounds per square inch through the preferably fan shaped nozzles 22, which gives a slightly diverging fan shaped jet whose width may be an inch and a half at a distance of three and a half inches from the nozzle. This jet strikes and loosens the cake and forces it to curl backward on itself as shown at 24. This action is aided by its own weight and when the back outer corner 25 of the sector comes under the jet, the complete cake may roll off in a single roll, as it frequently does, or it may come in pieces, landing on a deflector sheet 26 from which it falls into the hopper to be conveyed to any desired location such as a repulper if the filter is used in a paper making mill. Inasmuch as the cake may be of such nature as to break and fall directly into the hopper, an additional deflector sheet or pan 27 is desirably used.

Figure 3:
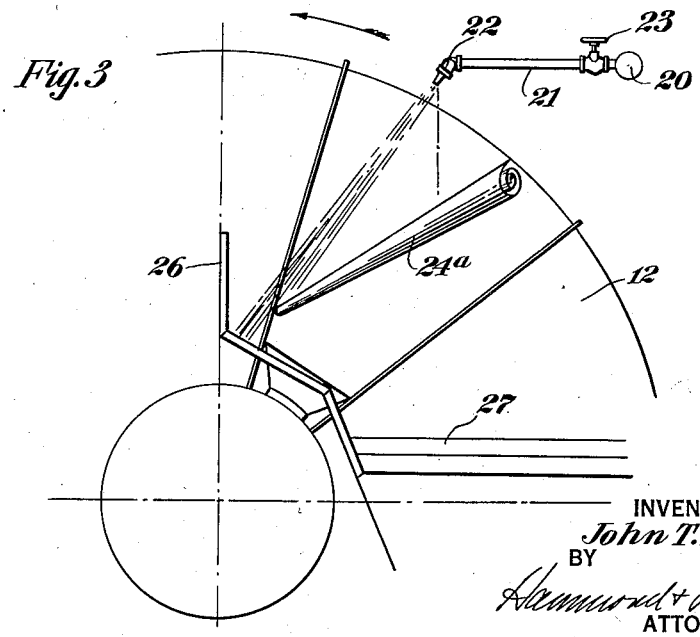
Figure 3 is a diagrammatic sketch of the cake discharging means operating against the side of a disc rotating counter clock-wise.

If it is desired to run the filter discs in the reverse or counter clockwise direction and still use liquids, as shown in Figure 3, the same construction of header and nozzles is used but the center line of the nozzle 22 is at an angle of thirty to forty degrees with the vertical and on a line substantially parallel to a radial line to the center of the sector, such as a tangent to the shaft 14. In this case, the jet cuts the cake 24a from the radial edge of the disc 12 as in the forward running position and the cake falls, due mostly to its own weight, and less to the force of the jet in the preceding case.

The nozzle is so directed that the edge of the jet, which in Figure 1 was deflecting the cake from the disc, is now the cutting edge. In this case as in the preceding case, the pressure of the water is preferably about eighty-five to one hundred pounds per square inch and the discharge per nozzle will be about three gallons per minute.

If a drier cake is desired and the water or other liquid used in the preceding method is objectionable, a gas or vapor may be used as the fluid pressure discharge media, with a slight change in the form of nozzle and the angles of its center line. This arrangement is shown in connection with Figures 4 and 5 in which the nozzle 30, being adapted for air, is provided with a small aperture and if air at fifty-five pounds per square inch is used, the aperture will desirably be of three sixty-fourths of an inch in diameter. The end of the nozzle is placed about one and one quarter inches from the edge of the disc and about three-eighths of an inch from the plane of the disc surface. It is adjusted so that the main body of the discharge of the nozzle will hit the edge of the disc just outside of the cake.

When running in the forward or clock-wise direction, as shown by the arrow in Figure 4, the nozzle is placed at an angle of approximately thirty-five degrees with the vertical permitting the air to get under the cake 24b by loosening it from the edge of the disc 12 and blowing the cake off in a solid sheet. The cake then lands on the vertical deflector sheet 26 in a much drier state than in the liquid discharge method and consequently requires more water flowing over this sheet to convey the cake into the hopper.

In running the filter discs 12 in the counter clock-wise or reverse direction, as shown in Figure 5, the center line of the nozzle 30a was substantially radial and a similar nozzle position as in the liquid discharge method when the discs were running in the same direction. In the arrangement using air, the discharge is much faster due to the force of the air blowing the cake 24c down directly into the repulper hopper 27a. The vertical deflector sheet 26 may be much smaller in this arrangement as the cake is not blown against it.

A further modification or arrangement of the device for use in connection with rotary drum filters is shown in Figures 6 and 7. The drum filter 40 is of any preferred type having the rotatable drum 41, journaled on the hollow filter shaft 42 driven by the gearing 43 and provided with the regulating and filtrate discharge valve 44, the entire structure being supported over the filter reservoir 45 by the legs 46. As is well known, the vacuum is applied to the valve 44 which at proper times draws the pulp onto the filter medium of fine cloth 47 as the drum 41 rotates through the reservoir tank 45. The filtrate is then discharged while the filter cake 48 forms on the surface of the drum and it must be removed for continuous operation.

The removal of this cake is advantageously accomplished by the heretofore mentioned method and it consists of having a header or conduit 49 extending longitudinally along the filter adjacent the periphery of the drum, and being provided with an adequate number of projecting conduits 50 in which there are adjustable nozzles 51 for either vapor, gas, or liquid as may be preferred. As the drum 41 rotates in a counter clock-wise direction, the nozzles 51 are directed at the cake to cause it to roll off the rotating drum and over the deflector plate 52 into any suitable hopper or conveying means. In this drum type of filter either air, or water, or similar materials could be used to remove the cake and it would only be necessary to change the nozzles to make the change from a liquid to a gas.

From the foregoing description, it is obvious that I have produced a far more desirable discharge means for cake removable in connection with rotary filters whether of the drum or disc type. By using either a liquid such as water or a gas such as air, or steam, there are many wearing parts removed, there is no injury to the filter fabric and yet the removal is quick, clean, economical and efficient with little or no added expense for equipment although any gas, vapor, or liquid could be used depending upon the material which forms the cake, the broad terms gas, vapor or liquid are intended to mean any suitable fluids.

It is another feature of the invention that because of either the fluid or liquid discharge jets, the filter medium is left in a much cleaner condition and in many cases, reducing the cleaning operation to one third the normal frequency. It is also obvious that several nozzles may be used on each side of the disc if the size of the disc or the nature of the cake should require it.

While I have described a preferred form of embodiment of the invention and have stated in exact detail certain desired arrangements of pressure and other conditions of nozzle shape, size, and location, it is obvious that many other modifications may be made for other certain conditions and I do not desire to be limited to the above details except as they are necessary in the scope of the claims appended hereto.

I claim:

1. In a continuous suction filter of the class described, a rotating filter medium, a support therefor, and a washing and sluicing cake removal mechanism mounted on said support comprising a fluid pressure conduit, a fixed nozzle on said conduit, said nozzle adapted to direct fluid pressure means against said filter medium at a substantially constant angle.

2. In a continuous suction filter of the class described, a rotating filter medium, a support therefor and a washing and sluicing cake removal mechanism mounted on said support comprising a fluid pressure conduit, a fixed nozzle on said conduit, said nozzle adapted to direct fluid pressure means against said filter medium at a fixed angle of substantially less than a right angle to said filter medium.

3. In combination in a rotary disc continuous suction filter, discs provided with a filter cloth on the faces thereof, means to form a cake of accumulated solids thereon and means to continuously discharge said solids comprising an adjustable nozzle having fixed positions for forward or reverse rotation of the filter disc and means to force a fluid through the nozzle under pressure and directed at a substantially constant angle to impinge on the filter cloth substantially near the edge thereof to loosen and remove the filter cake.

4. In combination in a rotary disc continuous suction filter, discs provided with a filter cloth on the faces thereof, means to form a cake of accumulated solids thereon and means to continuoulsy discharge said solids comprising an adjustable nozzle having fixed positions for forward or reverse rotation of the filter disc and means to force a fluid through the nozzle under pressure and directed at a substantially constant angle to impinge on the filter cloth substantially near the edge thereof to loosen and remove the filter cake and deflector plates between said discs to deflect the washing fluid and filter cake outside said filter.

In testimony whereof I have affixed my signature to this specification.

JOHN T. HOYT.